Feb. 7, 1939.   R. R. DONALDSON, JR   2,146,176
REGULATING DEVICE
Filed June 4, 1935
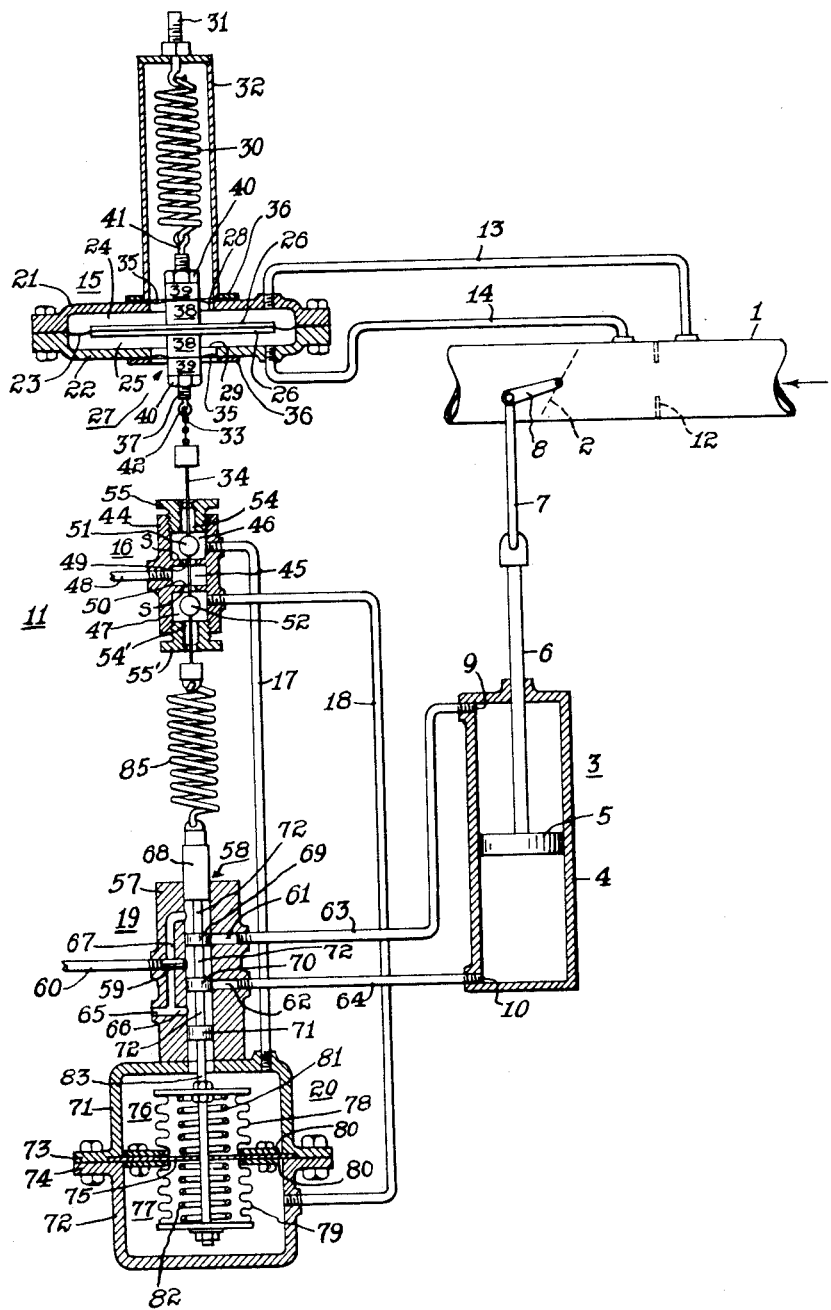
INVENTOR
Robert R. Donaldson Jr.
By Green & McCallister
His Attorneys Patented Feb. 7, 1939

2,146,176

UNITED STATES PATENT OFFICE 2,146,176

REGULATING DEVICE

Robert R. Donaldson, Jr., Pittsburgh, Pa., assignor to John M. Hopwood, Dormont, Pa.

Application June 4, 1935, Serial No. 24,860

10 Claims. (Cl. 121—41)

This invention relates to regulating devices for fluid operated motors of the reciprocating piston type, and more particularly to devices for effecting incremental step-by-step movement of the piston without the use of mechanical cut-off mechanisms of the type which are operated by movement of the piston.

An object of this invention is the provision of a regulating device that shall be sensitive to pressure changes and arranged to effect the transmission of at least two pressure impulses that vary inversely to each other in magnitude and which shall include a pilot valve having an operating mechanism which responds to the inversely varying pressure impulses to actuate the pilot valve to control the direction of movement of a piston in a cylinder and which shall be returned to off-position whenever the inversely varying pressure impulses reach predetermined values in relation to each other.

Another object of the invention is the provision of a pilot valve having differential pressure responsive mechanism for operating the same to its controlling "on" positions and its off-position, and means for supplying a differential pressure to the mechanism which, when of a predetermined value maintains the pilot valve in one of its operating positions, but when departing from such value operates the pilot valve to one or the other of its "on" positions.

Other objects of the invention will, in part, be apparent and, will, in part, be obvious from the following description taken in conjunction with the accompanying drawing, in which:

A regulating device embodying the invention is more or less diagrammatically illustrated and shown in operative relationship to a regulator disposed to regulate the flow of a medium through a conduit in response to changes in pressure conditions across an orifice.

In the drawing a pipe or conduit 1 is shown through which a fluid or gaseous medium flows and which flow is regulated by a damper or valve 2 operated by a motor or actuating device 3. Device 3 is illustrated as being of the hydraulic type comprising a cylinder 4 having a piston 5 therein and which is connected by a piston rod 6 and link 7 to the crank arm 8 of the damper. The cylinder is provided with ports 9 and 10 at its top and bottom, respectively, through which a motive fluid, such as oil, may be introduced to cause piston 5 to move down or up. The piston moves downwardly when oil is introduced through port 9 and upwardly when admitted through port 10. As is well understood in this art, one of the ports 9—10 is connected to exhaust when motive fluid is introduced into the cylinder through the other of these ports.

Device 3 is controlled by a regulating device 11 embodying this invention which responds to pressure conditions on opposite sides of an orifice 12 in conduit 1. Device 11 is connected by pipes 13 and 14 to the opposite sides of the orifice and as connected will respond to changes in the pressure drop across it. For a given adjustment of device 11, this device will so operate and control motor device 3 and therefore, the adjustment or position of damper 2, that the drop across orifice 12 is maintained substantially constant at some predetermined or desired value. By connecting device 11 to only one side of orifice 12, it will be apparent that the pressure on that side of the orifice may be maintained substantially constant at some predetermined value.

Device 11 comprises a pressure sensitive mechanism 15 which is connected by pipes 13 and 14 across orifice 12, and which responds to changes in pressure drop across it; and escapement valve 16 operated by mechanism 15 and which sends out pressure impulses through pipes 17 and 18, that vary inversely in magnitude relative to each other; a pilot valve 19 which controls the admission of motive fluid to cylinder 4 through ports 9 and 10, and an operating mechanism 20 which is connected to pipes 17 and 18 and operates the pilot valve in accordance with the difference between the magnitudes of these pressure impulses.

As will be shown later herein, mechanisms 15, 16, and 19 are balanced against a given pressure drop across orifice 12 and that if this pressure drop changes this balance will be upset to effect changes in the pressure impulses in lines 17 and 18; that in response to these changes in pressure, the pilot valve 19 will be operated to admit motive fluid to one side or the other of the piston 5 in cylinder 4 to effect such an adjustment of damper 2 as will restore the pressure drop to the desired value; and that device 20 will operate to shift or adjust the escapement valve 16 in a direction opposite to that in which it was moved by device 15 so that the pressure impulses in lines 17 and 18 will be restored to the relative values existing between them when the pressure drop across orifice 12 was of the value for which device 11 was balanced.

Device 15 comprises a diaphragm chamber or housing made up of complementary parts 21 and 22 between which the marginal edge of a flexible diaphragm 23 is secured in a pressure-tight relationship. The diaphragm separates the interior of the housing into two chambers 24 and 25 one of which is connected by pipe 13 to the upstream side of orifice 12 and the other of which is connected by pipe 14 to the downstream side of this orifice. The inner portion of diaphragm 23 is backed on each side by backing plates 26 through which extends a connecting means 27 that projects through openings 28 and 29 in parts 21 and 22 of the diaphragm housing. The upper end of this connecting means is connected to the lower end of a tension spring 30 which is supported from an adjustable screw support 31 carried by a support 32 secured to housing member 21. The lower end of connecting means 27 is connected by a flexible link 33 to a valve link 34 of escapement valve 16.

The openings 28 and 29 through which connecting means 27 extends are sealed by means of light flexible diaphragms 35 the outer edges of which are clamped tightly to the housing parts by means of clamping rings 36.

Connecting means 27 comprises a through bolt 37 which extends through the central portion of diaphragm 23 and backing plates 26, and is provided with cylindrical members 38 screwthreaded thereon to clamp the backing plates tightly into engagement with the diaphragm. The sealing diaphragms 35 are clamped between members 38 and cylindrical members 39 which are threaded onto the through bolt and which are locked in place by means of lock nuts 40. The connection between the through bolt and the lower end of spring 30 is made by any suitable means, as for example, a hook 41 threaded into the end of the through bolt. The lower end of the through bolt 37 is connected by a hook 42 to flexible connection 33.

Escapement valve 16 comprises a valve body 44 having internal chambers 45, 46, and 47 therein. Chamber 45, the central chamber, is connected by a pipe 48 to a source of fluid pressure which is maintained at a substantially constant pressure, and chambers 46 and 47 are connected to pipes 17 and 18, respectively. The partitions between chamber 45 and chambers 46 and 47 are provided with openings 49 and 50 which openings are controlled by valve members 51 and 52 secured to valve link 34. Valve members 51 and 52 are shown as being spherical in form and so positioned as to cooperate with tapered seats S formed at the edges of openings 49 and 50. When valve members 51 and 52 are equally spaced from seats S, the pressures in chambers 46 and 47 and in lines 17 and 18 will be equal provided the leakage from chambers 46 and 47 is equal.

The leakage from chambers 46 and 47 takes place through leak-off ports 54 and 54' formed in bushings 55 and 55' which are threaded into the opposite ends of the valve body 44. The leak-off ports 54 and 54' are controlled also by valve members 51 and 52, so that the pressure existing in chambers 46 and 47 and in pipes 17 and 18, at any time, will be dependent upon the relative pressure drops through valve openings 49 and 50 and through leak-off ports 54 and 54' as determined by the relative distances of valve members 51 and 52 from the respective valve openings or ports controlled thereby.

If valve members 51 and 52 are equi-distant from seats S, and if bushings 55 and 55' are adjusted so that ports 54 and 54' are equi-distant from members 51 and 52 the pressures in chambers 46 and 47 and in pipes 17 and 18 will be equal. When ball valves 51 and 52 are moved upwardly, leak-off port 54 is restricted, as is valve opening 50, while leak-off port 54' is opened wider as is valve opening 49. Therefore, the pressure in chamber 46 and pipe 17 will increase because of less leakage through port 54, and the pressure in chamber 47 and pipe 18 will decrease because of increased leakage from this chamber and this pipe through port 54'. If the ball valves are moved downwardly, the opposite action takes place, i. e., the pressure in chamber 46 and pipe 17 decreases while the pressure in chamber 47 and pipe 18 increases.

The pressure in chamber 46 and pipe 17 reaches its maximum value when leak-off port 54 is closed and port 50 is closed or nearly closed, at which time the pressure in chamber 47 and pipe 18 will reach its minimum value.

Pilot valve 19 comprises a valve body 57 having a cylindrical bore in which a valve 58 is disposed. The valve body has an inlet passage 59 communicating with the bore of the valve body and to which a pipe 60 is connected, pipe 60 being connected to a supply of motive fluid (not shown), two outlet ports 61 and 62 connected respectively to ports 9 and 10 of the cylinder 4 by pipes 63 and 64, and an exhaust port 65. The exhaust port is connected by passages 66 and 67 to the valve bore at points above and below outlet ports 61 and 62, respectively.

Valve 58 is of the balanced type and has a plurality of spaced cylindrical portions 68, 69, 70, and 71 which fit the bore of the valve body and which are separated and connected by portions 72 of reduced diameter. The inlet passage 59 is positioned midway between ports 61 and 62 and portions 69 and 70 of valve 58 are so spaced that when valve 58 is in off or neutral position, ports 61 and 62 are closed and no motive fluid can pass through the valve from the supply pipe 60 to either end of cylinder 4.

If valve 58 is moved upwardly, port 61 is placed in communication with passage 59 so that motive fluid can enter cylinder 4 through port 9, while at the same time the lower end of the cylinder is connected to exhaust, as ports 10 and 62 are placed in communication with exhaust passage 66 and exhaust port 65. This allows motive fluid to escape from the lower end of cylinder 4 when the piston moves downwardly. When valve 58 is returned to neutral or off position, the piston stops moving.

When valve 58 is moved downwardly from neutral position, the lower end of cylinder 4 is connected to supply pipe 60 as port 62 is placed in communication with inlet passage 59, and the upper end of the cylinder is connected to exhaust passage 67 and exhaust port 65 as port 61 is shut off from inlet passage 59 and connected with passage 67. The piston 5 will therefore move upwardly to force motive fluid out of the space above it to exhaust as above described.

Valve 19 is operated by device 20 in accordance with the difference in pressure impulses set up in pipes 17 and 18. Device 20 comprises a pressure-tight housing made up of complementary parts 71 and 72 having flanges 73 and 74 which are bolted together as shown. Between these flanges a partition 75 is clamped which divides the housing into chambers 76 and 77 and supports bellows 78 and 79 therein. The open ends of these bellows are clamped with rings 80 in pressure-tight relationship to support 75. These bellows are provided with compression springs 81 and 82 which tend to expand them and which yieldingly oppose contraction thereof when pressure is admitted to chambers 76 and 77. Valve 58 is connected by a rod 83 to bellows 78 and 79, being rigidly connected to the respective upper and lower ends thereof as shown. Pressure is admitted to chambers 76 and 77 by pipes 17 and 18, respectively, and when the pressures in these chambers are equal, valve 58 will be held in its neutral or off position. When the pressure is greater in one of these chambers than in the other, valve 58 will be moved either upwardly or downwardly; it will be moved upwardly, if the pressure in chamber 77 is greater than in chamber 76 or downwardly if the pressure in chamber 76 is greater than in chamber 77.

From the above it is seen that downward movement of valve 58 corresponds to upward movement of valve link 34, diaphragm 23, and piston 5, with corresponding adjustment of damper 2 towards open position, caused by valve 16 increasing the pressure in chamber 76 and decreasing the pressure in chamber 77, the result of a decrease in pressure drop across orifice 12. Likewise, upward movement of valve 58 corresponds to downward movement of valve link 34, diaphragm 23, and piston 5, with corresponding adjustments of damper 2 towards closed position, caused by an increase in pressure in chamber 77 and a decrease in chamber 76, the result of an increase in pressure drop across orifice 12.

Valve 58 is yieldingly connected to valve link 34 by a spring 85 which cooperates with bellows 78 and 79 to shift or tend to shift valve link 34 and valve members 51 and 52 in a direction opposite to that in which link 34 is moved by diaphragm 23. Thus device 20 acting through valve 58 and spring 85 operates on valve 16 to reestablish equilibrium between the pressures in chambers 76 and 77 and thereby to return valve 58 to off position. This action occurs with each increment or change in pressure drop across orifice 12 so that incremental step-by-step movement of piston 5 and adjustment of damper 2 may be effected in response to increasing and decreasing pressure drops across orifice 12. Therefore, when the pressure drop across orifice 12 varies from a predetermined value, adjustments of damper 2 are accomplished incrementally in the direction which corrects the condition and restores the pressure drop to the desired value, thereby preventing hunting of regulator 3 and over or under correction of the pressure drop.

The operation of the regulator shown in the drawings is as follows: When the pressure drop across orifice 12 is at the value to be maintained and device 11 is in adjustment, there will be tension in springs 30 and 85, valve 16 will be in its neutral position and the pressure in chambers 76 and 77 of device 20 will be equal so that valve 19 will also be in its neutral or off position. Also the pressure differential acting on diaphragm 23 will be in equilibrium with the forces exerted on it by springs 30, 85 and the weight of the moving parts between spring 85 and diaphragm 23.

If the pressure drop across orifice 12 increases, diaphragm 23 will move downwardly thereby increasing the tension in spring 30, causing an unbalance between springs 30 and 85. Valve link 34 will therefore move downwardly and relieve the tension in spring 85. As valve link 34 moves downwardly, valve member 51 moves away from leak-off port 54 and towards valve passage 49, thereby restricting the flow of fluid into chamber 46. This allows fluid to escape through port 54 from chamber 46 at a greater rate than it flows into the same from pipe 48, thereby decreasing the pressure in chamber 76 of device 20. With downward movement of link 34, valve member 52 moves away from valve passage 50, thereby increasing the flow area through it and moves towards valve port 54', thereby throttling and restricting the leak-off through bushing 55'. This causes the pressure in chamber 47 to increase whereby the pressure transmitted through pipe 18 to chamber 77 of device 20 is increased. The pressure in chamber 77 being greater than in chamber 76, valve 58 is moved upwardly so that motive fluid is admitted to the upper end of cylinder 4, the lower end being then connected to exhaust, so that piston 5 will move downwardly and shift damper 2 towards closed position. This adjustment tends to decrease the pressure differential acting on diaphragm 23. When valve 58 moves upwardly, the tension in spring 85 is relieved again so that this, with the decrease in drop across orifice 12 and the increased tension in spring 30 caused by downward movement of diaphragm 23, will cause diaphragm 23 and valve link 34 to move upwardly towards their neutral positions. As valve 16 approaches its neutral position the pressure in chamber 76 of device 20 is gradually increased while that in chamber 77 is gradually decreased and when these pressures become equal, valve 58 will be in its neutral or off position and movement of piston 5 will stop. If damper 2 has not been moved far enough towards closed position to restore the pressure drop across orifice 12, to the desired value the above described operation will be repeated until the pressure drop across the orifice is restored to its proper value, i. e., that value which will place device 11 in a state of balance, which as stated previously herein, occurs when diaphragm 23 and the forces exerted on it by springs 30 and 85 are in balance, and valves 16 and 19 are in their neutral positions.

If the pressure drop across orifice 12 decreases, the opposite action takes place in that diaphragm 23 moves upwardly, moving valve member 51 away from the valve passage 49 and towards leak-off port 54 thereby causing the pressure in chamber 46 and in pipe 17 to increase whereby the pressure in chamber 76 of device 20 is increased at the same time, valve member 52 moves towards valve passage 50 and away from leak-off port 54' whereby the pressure in chamber 77 of device 20 is reduced. This causes valve 58 to move downwardly so that pressure is admitted to the bottom of cylinder 4 and cause piston 5 to move upwardly to shift damper 2 towards open position. Downward movement of valve 58 increases the tension in spring 85 so that valve link 34 is pulled downwardly to thereby return valve members 51 and 52 to their neutral positions and gradually restore the pressures in chambers 76 and 77 to equal values so that valve 58 will be returned to its neutral or off position. This action will be repeated until the pressure drop across valve 12 is restored to the proper value.

While device 11 has been shown as regulating the pressure drop across an orifice to thereby maintain the flow of a medium through a conduit substantially constant, it will be appreciated that either chamber, 24 or 25 of device 15, may be connected to a medium, the pressure of which is to be regulated. Chamber 24 may be connected to a source of pressure higher than atmospheric which is to be regulated, or chamber 25 may be connected to a source of suction which is to be regulated.

While device 11 has been shown as controlling the operation of a fluid operated cylinder which in turn controls or adjusts a damper, it will be appreciated that this fluid operated cylinder may be utilized to operate any device which performs a regulating function to which diaphragm 23 responds.

Having thus described the invention, what I claim as new and desire to secure by Letters Patent is:

1. Regulating apparatus comprising pressure responsive means, means for transmitting a plurality of pressure impulses one of which varies directly and another inversely in accordance with the response of said pressure responsive means to a variable pressure condition, means responsive to and operated in accordance with the difference between said pressure impulses, and a pilot valve controlled by said differential pressure operated means for controlling the delivery of motive fluid to one end or the other of a cylinder in which a piston is working and thereby controlling the direction of movement of the piston, and means actuated by said differential pressure operated means for yieldingly urging the pressure responsive means in a direction tending to cause the transmitted pressure impulses to approach equilibrium.

2. The combination with a fluid pressure operated motor comprising a cylinder having a piston mounted for reciprocation therein, and a pilot valve for controlling the delivery of pressure fluid to one side or the other of the piston, of pressure actuated means for operating the pilot valve in accordance with a pressure differential applied thereto, an escapement valve having a port connected to a supply of fluid pressure and two outlet ports connected in opposed relation to the pressure actuated means, each port being connected to a restricted leak-off passage, and pressure responsive means for so controlling said escapement valve that the pressures delivered through said ports vary inversely to each other thereby maintaining a pressure differential on said pressure actuated means that is a function of the pressure acting on the pressure responsive means, and yieldable means controlled by the differential pressure actuated means for urging said escapement valve toward a position in which the pressures delivered through its outlet ports approach equilibrium.

3. Regulating apparatus comprising a diaphragm responsive to changes in pressure on a side thereof, a valve having an inlet chamber for a flowing fluid medium communicating through valve ports with discharge chambers, each having an exhaust port and an outlet port, and valve members connected to the diaphragm and positioned to restrict one of said valve ports and uncover the other in accordance with the direction and extent of movement of the diaphragm whereby the pressures in said chambers are caused to vary oppositely in magnitude, a cylinder having a piston working therein and provided with ports at its opposite ends for the admission of a motive fluid, a pilot valve having ports connected to said cylinder ports and an exhaust port, said pilot valve delivering motive fluid to one of the cylinder ports while exhausting from the other to cause the piston to move in one direction or the other in accordance with the position of the valve, means for operating said pilot valve including a differential diaphragm connected on opposite sides to the respective outlet ports of said discharge chambers, and a resilient connection between said pilot valve and said first mentioned diaphragm arranged to urge said valve members towards the position in which the pressures in said discharge chambers are restored towards equal values.

4. Regulating apparatus comprising a diaphragm responsive to changes in pressure on a side thereof, a valve having an inlet chamber for a flowing fluid medium communicating through valve ports with discharge chambers each having an exhaust port and an outlet port, and valve members connected to the diaphragm and positioned to restrict one of said valve ports and uncover the other in accordance with the direction and extent of movement of the diaphragm whereby the pressures in said chambers are caused to vary oppositely to each other in magnitude, a cylinder having a piston working therein and provided with ports at its opposite ends for the admission of a motive fluid, a pilot valve having ports connected to said cylinder ports and an exhaust port, said pilot valve delivering motive fluid to one of the cylinder ports while exhausting from the other to cause the piston to move in one direction or the other in accordance with the position of the valve, means for operating said pilot valve including a differential pressure actuated member connected on opposite sides to the respective outlet ports of said discharge chambers, and a resilient connection between said pilot valve and said discharge chamber valve members disposed to actuate said valve members in a direction opposite to that in which they were moved by said pressure responsive diaphragm.

5. Regulating apparatus comprising a diaphragm responsive to changes in pressure on a side thereof, a valve having an inlet chamber for a flowing fluid medium communicating through valve ports with discharge chambers each having an exhaust port and an outlet port, and valve members connected to the diaphragm and positioned to restrict one of said valve ports and uncover the other in accordance with the direction and extent of movement of the diaphragm whereby the pressures in said chambers are caused to vary oppositely to each other in magnitude, a cylinder having a piston working therein and provided with ports at its opposite ends for the admission of a motive fluid, a pilot valve having ports connected to said cylinder ports and an exhaust port, said pilot valve delivering motive fluid to one of the cylinder ports while exhausting from the other to cause the piston to move in one direction or the other in accordance with the position of the valve, means for operating said pilot valve including a differential pressure actuated member connected on opposite sides to the respective outlet ports of said discharge chambers, and a yieldable connection between said diaphragm and differential pressure actuated member tending to urge the pressure responsive diaphragm in a direction opposite to that in which it is moved in response to a pressure change.

6. In regulating apparatus, a multi-port valve having two outlet ports for the transmission of pressure impulses and both connected to a common supply source of pressure medium, and a throttling valve disposed to increase the pressure to one outlet and simultaneously decrease the pressure to the other outlet in accordance with the position of said valve, a pressure responsive element for moving said valve in one direction or the other in accordance with changes in pressure acting thereon, a pilot valve disposed to deliver a pressure fluid to one side or the other of a piston working in a cylinder and simultaneously exhausting fluid from the side of the piston opposite to that receiving pressure fluid, a differential diaphragm connected to the respective outlet ports of the multi-port valve and disposed to actuate said pilot valve in accordance with the difference between the pressures at said ports, and a yielding connection between said pressure responsive element and said differential diaphragm arranged to urge said pressure responsive element in a direction opposite to that in which it was moved by the change in pressure acting thereon.

7. In regulating apparatus, means responsive to variations in a pressure to be controlled, valve means controlled by said pressure responsive means adapted to transmit two pressure impulses varying oppositely in magnitude in accordance with variations in a pressure to be controlled, an actuator connected to respond to the difference between said pressure impulses, a pilot valve connected to be operated by said actuator, said valve having two "on" ports, an "off" position, and an exhaust port associated with said "on" ports, a cylinder having a piston working therein, one end of which cylinder is connected to one of said "on" ports and the other being connected to the other of said "on" ports, said piston moving one way or the other under the influence of a pressure fluid admitted through one or the other of said "on" ports, and means yieldingly interconnecting said actuator and pressure variation responsive means arranged to cause the valve means to equalize the pressure impulses transmitted thereby to said actuator.

8. A regulating device comprising pressure responsive means, a valve actuated by said pressure responsive means, a motor device including a cylinder and piston, a pilot valve for controlling the delivery of operating fluid to said cylinder, means under the control of said first mentioned valve for operating the pilot valve, and a resilient connection between said pressure responsive means and pilot valve operating means arranged to yieldingly oppose movement of said pressure responsive means and to be operated by said pilot valve operating means to urge the valve actuated by said pressure responsive means in a direction opposite to that in which it is actuated thereby.

9. The combination with a cylinder having a piston working therein, and a pilot valve for controlling the delivery of pressure operating fluid to the cylinder, of pressure actuated means for operating the pilot valve in accordance with variations in pressure applied to said means, an escapement valve disposed to control the delivery of operating fluid to said pressure actuated pilot valve operating means, pressure responsive means for operating said escapement valve in accordance with changes in pressure applied thereto, and a yieldable element operatively connected to said pilot valve operating means and said pressure responsive means tending to yieldingly oppose movement of said pressure responsive means and to be operated by said pilot valve operating means to urge the escapement valve in a direction opposite to that in which it is moved by the pressure responsive means.

10. Regulating apparatus comprising a pressure responsive diaphragm, a spring connected to said diaphragm and yieldingly urging it in one direction against pressure variations, a valve actuated by said diaphragm, a motor device comprising a cylinder and piston, a pilot valve for controlling the admission of actuating fluid to said cylinder, means under the control of said first mentioned valve for operating said pilot valve, and a spring operatively connected to said pilot valve operating means and said pressure responsive diaphragm arranged to be operated by said pilot valve operating means to urge said diaphragm in a direction opposite to that in which it moves under the influence of said pressure variations.

ROBERT R. DONALDSON, Jr.